Dec. 11, 1945. J. C. WILCOX 2,390,976
VIBRATION ABSORPTION DRIVING DEVICE FOR MACHINE DOGS
Filed Feb. 26, 1945
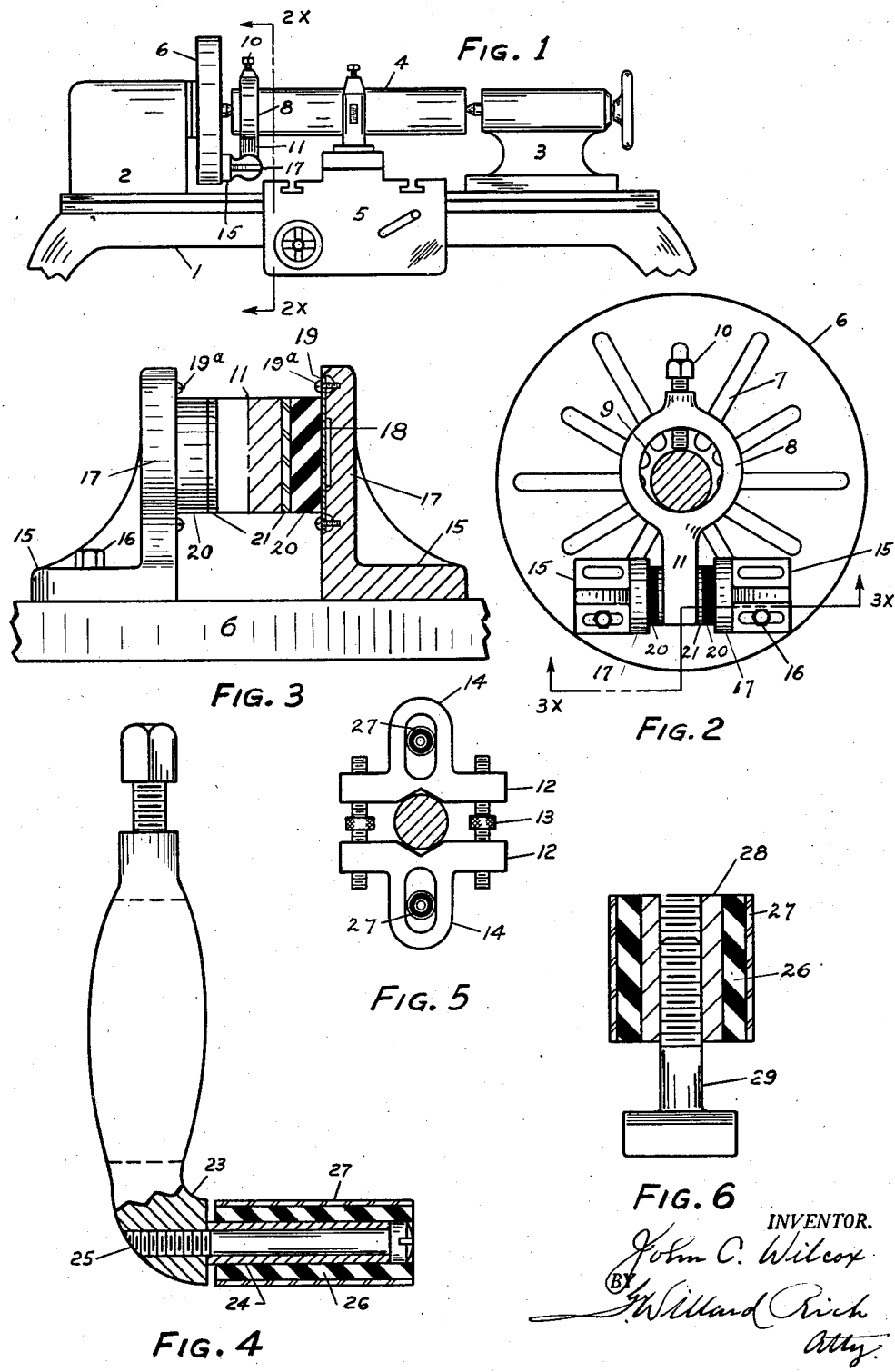

Patented Dec. 11, 1945

2,390,976

UNITED STATES PATENT OFFICE 2,390,976

VIBRATION ABSORPTION DRIVING DEVICE FOR MACHINE DOGS

John C. Wilcox, Erie, Pa.

Application February 26, 1945, Serial No. 579,855

1 Claim. (Cl. 82—41)

My invention has for its object to improve the operation of lathes, grinding machines and the like which are employed for doing turning operations on work pieces of various sizes, by absorbing not only the inherent vibrations created by the machine elements when in operation, but also the induced vibrations imparted to the work piece by the cutting action of the tool in performing a given operation, these generated vibrations in turn being imparted to the machine.

A further object of my invention is to provide an improved form of drive, useful in conjunction with the face plate of a lathe, or corresponding part of some other type of machine, and the connecting dog which rotates the work piece whereby a yielding action is effected that will absorb vibration occurring during the cutting or grinding operation irrespective of the direct cause of such vibrations.

To these and other ends my invention consists in further improvements and arrangement of parts all as will be more fully described in the following specification, the novel features thereof being set forth in the appended claim.

In the drawing:

Fig. 1 is a front view, somewhat diagrammatic of a lathe showing the general assembly of parts employed in a simple turning operation upon a work piece, the view being employed to show the general application of driving devices embodying my invention.

Fig. 2 is an enlarged front or plan view of a face plate taken on the line 2x—2x of Fig. 1.

Fig. 3 is an enlarged plan view of a driver illustrating one embodiment of my invention.

Fig. 4 is a side elevation, partly in section of a lathe dog, or work piece holder, showing my invention applied thereto.

Fig. 5 is a face view of a so called balanced type of dog and,

Fig. 6 is a longitudinal sectional view of one of the two drivers or studs for use with the type of dog shown in Fig. 5 constructed in accordance with my invention.

Similar reference numbers in the several figures indicate similar parts.

In order to facilitate an understanding of the objects of my invention and the manner in which they are accomplished, I have shown in Fig. 1 a lathe comprising the frame or bed 1 carrying the head stock 2, the tail stock 3 between which is a work piece 4 supported on the usual centers. Between said stocks is a travelling tool carriage, 5.

The head stock contains a driving spindle, carrying the face plate 6, and a suitable train of gears and pinions for controlling its rotation at any selected, or desired, speed which are driven from a suitable source of power as will be understood.

The face plate 6 is provided with a series of radial slots 7 serving as a connecting means between it and the work piece 4 which is driven in unison therewith by the dog 8. The latter may be of the usual construction, as shown in Fig. 2, provided with a central aperture 9 to receive the end of the work piece to which it is clamped by a set screw 10. Extending from one side of the dog is a tail piece 11. On one of commonest forms of dogs, the tail piece has a laterally extending finger which in operation is engaged in one of the slots 7 of the face plate. In the event the dog has a straight tail, movement is imparted to it by a separate stud, or studs, bolted to the face plate which engage one or both sides of the tail.

In Fig. 5, I have illustrated one of the so-called balanced dogs which is made of two similar parts 12 notched on their proximate faces to engage a work piece and adjustable relatively toward and from each other by threaded bolts 13. In this form of dog each of the half sections is provided with a slotted ear 14 which receive studs rigidly connected to the face plate.

From the foregoing preamble my invention, which resides in the connecting element between the face plate and the dog proper, will be more readily comprehended. It is becoming to be appreciated and admitted in the machine art that all rotary machines are more or less subject to inherent vibrations having a natural frequency created by their rotating parts and that these are imparted to the work piece often making it difficult for even the skilled operator to maintain the tolerances set forth in the specifications to which he may be required to work.

Another factor effecting machine vibrations which I believe is not understood, are those which I classify as imparted vibrations, created by the operation of the tool mounted on the carriage 5, which may vary in intensity as the work piece revolves against the tool. I have also discovered that these imparted vibrations combine in various ways with the natural frequencies of the machine and tend to set up a rhythm that may on occasion materially affect the accuracy of the work being performed. To overcome these difficulties in a simple and inexpensive manner, I provide a yielding cushion between the face plate and the work piece dog.

In Fig. 3, I have shown a driving element which is adapted to be used at one or on both sides of the straight tail 11. It comprises a bracket having a slotted base 15, by which it may be secured to the face plate by a bolt 16, and the upstanding portion 17 carrying a yielding element. The latter I construct of a backing plate 18 which is preferably circular having a surrounding flange 19 by which it is attached to the part 17 of the bracket, as by screws 19a. The outer face of the backing carries a disc 20 of yieldable material, having rubber like characteristics, and which is preferably resistant to oil. This material in turn carries a thin plate 21 as a protector or wearing surface.

Fig. 4 shows the dog of Fig. 2 provided with a laterally extending finger 23, the extremity of which where it enters a slot in the face plate, being provided with the aforementioned cushion. In this construction, I provide the desired yielding qualities by utilizing a cylindrical core 24, secured to the dog by a bolt 25, carrying a sleeve 26 of rubber like material which in turn is covered by an outer shell 27 as a protection and wearing surface.

The cylindrical arrangement of the parts just described is also used in making the face plate studs shown in Fig. 6 the structural difference being in providing the inner core 28 with a central screw threaded aperture to receive the outer end of the bolt 29 the opposite extremity of which carries a T shaped head for engagement with the rear side of the face plate. In practice two of these studs will be used with the balanced dog shown in Fig. 5, one in each of the slotted ears 14.

The rubber or synthetic rubber components of which the cushioning part of the vibration damper is composed is preferably secured to the faces of the plates 18 and 21 of Fig. 3 and to the outer and inner walls of the cylindrical members 24 and 27 by suitable bonding which may be accomplished as part of the vulcanizing or curing process to which the assembled parts are subjected.

The invention claimed is:

A driver connection between the face plate of a lathe, or similar machine, and the dog on a work piece mounted on the latter, comprising a bracket attached to the face plate, and a demountable member on the bracket, a pad of rubber like material on said member and an overlying covering plate on the rubber, said assembly being mounted on the bracket in a position to engage the dog and during operation of the machine serving to absorb inherent vibrations created therein.

JOHN C. WILCOX.